United States Patent [19]
Klontz et al.

[11] Patent Number: 5,157,319
[45] Date of Patent: Oct. 20, 1992

[54] CONTACTLESS BATTERY CHARGING SYSTEM

[75] Inventors: Keith W. Klontz, Sun Prairie; Deepakraj M. Divan, Madison; Donald W. Novotny, Madison; Robert D. Lorenz, Madison, all of Wis.

[73] Assignee: Electric Power Research Institute, Palo Alto, Calif.

[21] Appl. No.: 766,756

[22] Filed: Sep. 27, 1991

[51] Int. Cl.$^5$ .................. H02J 7/00; H01F 17/06; H01F 40/10; H02M 45/04
[52] U.S. Cl. ................................. 320/2; 320/21; 336/DIG. 2
[58] Field of Search ............... 336/DIG. 2; 320/2, 21

[56] References Cited

U.S. PATENT DOCUMENTS

| | | | |
|---|---|---|---|
| 3,742,408 | 6/1973 | Jaeger | 336/DIG. 2 X |
| 3,885,211 | 5/1975 | Gutai | 320/2 |
| 4,913,258 | 4/1990 | Sakurai et al. | 310/60 RX |
| 4,953,726 | 9/1990 | Loutan | 74/50 X |

OTHER PUBLICATIONS

E. T. Bowers, "Safety Aspects of Pneumatic Transport," Bureau of Mines Information Circular No. 9006, U.S. Dept. of Interior, pp. 6–20, 1985.
K. Lashkari, S. E. Schladover, and E. H. Lechner, "Inductive Power Transfer to an Electric Vehicle," 8th International Electric Vehicle Symposium, Washington, DC, Oct. 1986.
E. H. Lechner and S. E. Schladover, "The Roadway Powered Electric Vehicle–An All-electric Hybrid System," 8th International Electric Vehicle Symposium, Washington, DC, Oct. 1986.
S. E. Schladover, "Systems Engineering of the Roadway Powered Electric Vehicle Technology," 9th International Electric Vehicle Symposium, Toronto, Ont. Canada, Nov. 1988.
M. H. Kheraluwala, D. W. Novotny, D. M. Divan, "Design Considerations for High Frequency Transformers," *IEEE-PESC-90 Record*, pp. 734–742.
HLN Weigemann, D. W. Novotny, D. M. Divan, R. Mohan, "A ZVS Dual Resonant Converter for Battery Charging Applications," Power Electronics Specialists Conference, 1991.
F. C. Schwarz, J. B. Klaassens, "Controllable 45-kW Current Source for DC Machines," *IEEE Transactions Industry Applications*, vol. IA-15, No. 4, Jul./Aug., 1979, pp. 437–444.
D. M. Divan, G. Venkataramanan, R. DeDoncker, "Design Methodologies for Soft Switched Inverters," *IEEE-IAS 1988 Conference Record*, pp. 758–766.
J. M. Hillhouse, "EV's Downunder–Electric Vehicles in Mining," 10th International Electric Vehicle Symposium, Hong Kong, Dec., 1990.
A. Esser, H. C. Skudelny, "A New Approach to Power Supplies for Robots," *IEEE Transactions on Industry Applications*, vol. 27, No. 5, Sep./Oct. 1991, pp. 872–875.

*Primary Examiner*—R. J. Hickey
*Attorney, Agent, or Firm*—Klarquist, Sparkman Campbell, Leigh & Whinston

[57] ABSTRACT

A contactless recharging system and method for recharging an energy storage device onboard an electric vehicle has a primary converter for converting power from a power source into high frequency power. A secondary converter on board the vehicle is coupled to the battery for converting high frequency power into charging power supplied to the energy storage device. The primary and secondary converters are coupled together by a contactless coupling of a conductor loop and a coupling link forming a coaxial winding transformer. The coupling link has a magnetic core and a core-mounted conductor at least partially surrounded by the magnetic core. The core-mounted conductor selectively at least partially surrounds a portion of the conductor loop to transfer power therebetween. The core-mounted conductor is coupled to either the primary or the secondary converter, with the conductor loop being mounted to the other of the primary and the secondary converters.

50 Claims, 4 Drawing Sheets

CONTACTLESS BATTERY CHARGING SYSTEM

BACKGROUND OF THE INVENTION

The present invention relates generally to battery recharging systems, and more particularly to an improved contactless battery recharging system, such as may be used in electric vehicles and the like to enhance safety, reliability and user convenience.

Given the anticipated proliferation of electric vehicles, it will be necessary to have a distributed and reasonably standardized recharging configuration, located at, for instance, the vehicle operator's residence, place of business, parking garages, recharge stations, and the like. In determining the standardized system that will be implemented on a large scale basis, the important considerations are initial cost, operating cost, reliability, and user safety.

Using currently available technology, the most likely approach for battery recharging would be a conductor metal-to-metal contact in a plug and socket arrangement supplying alternating current (AC) or direct current (DC) power to the vehicle. Charging would be accomplished by the vehicle operator physically making the connection between the vehicle and the power supply outlet. Given the high currents and voltages required to recharge electric vehicles for operation, this connection by an untrained and unskilled operator could create unnecessary hazards, particularly if no means were provided for a quick automatic disconnect of the vehicle from the charging source. Furthermore, the need for providing charging opportunities at distributed locations as mentioned above, would be impacted by these same concerns.

Thus, a need exists for a contactless battery recharging system, such as may be used to provide power to electric vehicles, which is directed toward overcoming, and not susceptible to, the above limitations and disadvantages.

SUMMARY OF THE INVENTION

According to one aspect of the present invention, a contactless recharging system and method for recharging an energy storage device onboard an electric vehicle has a primary converter for converting power from a power source into high frequency power. A secondary converter on board the vehicle is coupled to the battery for converting high frequency power into charging power supplied to the energy storage device. The primary and secondary converters are coupled together by a contactless coupling of a conductor loop and a coupling link forming a coaxial winding transformer. The coupling link has a magnetic core and a core-mounted conductor at least partially surrounded by the magnetic core. The core-mounted conductor selectively at least partially surrounds a portion of the conductor loop to transfer power therebetween. The core-mounted conductor is coupled to either the primary or the secondary converter, with the conductor loop being mounted to the other of the primary and the secondary converters.

An overall object of the present invention is to provide an improved battery recharging system for use in recharging electric vehicle batteries.

A further object of the present invention is to provide an improved method of recharging batteries used in electric vehicles.

An additional object of the present invention is to provide an improved manner of coupling an electric vehicle with a power source.

An additional object of the present invention is to provide an improved battery recharging system which enhances user safety, increases convenience, decreases recharging time, and increases battery recharge efficiency and battery life.

Another object of the present invention is to provide an improved battery recharging system for electric vehicles which has enhanced reliability and may be installed and used at a reasonable cost.

The present invention relates to the above features and objects individually as well as collectively. These and other objects, features and advantages of the present invention will become apparent to those skilled in the art from the following description and drawings.

DETAILED DESCRIPTION OF THE PREFERRED EMBODIMENTS

Figure 1:
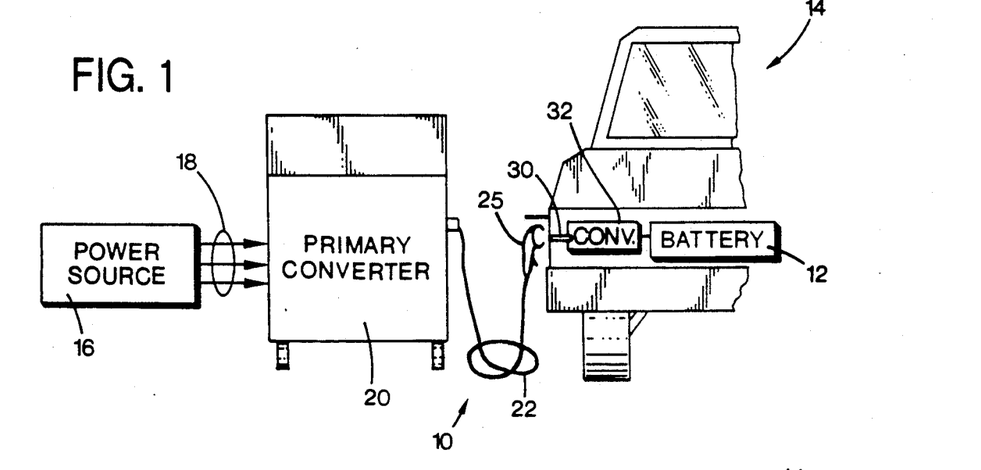
FIG. 1 is a partially schematic rear elevational view of one form of a contactless recharging system of the present invention for recharging an energy storage device, such as a battery-on-board an electric vehicle.

FIG. 1 illustrates an embodiment of a contactless system 10 constructed in accordance with the present invention for supplying charging power for recharging an energy storage device, such as a battery system or battery 12 of an electric vehicle 14. While the energy storage device is illustrated for simplicity as a battery 12, it is apparent that the recharging systems described herein may be used to recharge any other type of energy storage device, such as a superconducting magnetic energy storage device, an electromagnetic flywheel, and the like. It is apparent that the electric vehicle embodiment is provided merely by way of example herein and this system may be used with any electrical load having internal or onboard energy storage capability.

The recharging system 10 receives power from an electrical power source 16, via conductors 18. The power source 16 may be a single phase or a polyphase alternating current (AC) source or a direct current (DC) source as desired for a particular application. A primary converter, such as a high frequency current source converter 20, converts power received from the source 16, such as AC power at a line frequency (60 Hz in the United States) to a high frequency, for instance, on the order of 2–50 kHz. The operation of the various components of the recharging system 10, such as primary converter 20, is discussed further below after an overview of the operational interrelationship between the various components.

The high frequency AC power from the primary converter 20 is delivered by a tethering conductor or tether 22 to coupling means, such as a coupling sheath or link 25 described further below (see FIGS. 2 and 3). The link 25 is configured to clamp onto a secondary power pickup conductor loop 30 mounted to vehicle 14. The term contactless as used herein means without any electrical contact between two conductors, other than magnetic coupling between the conductors. When link 25 is coupled with conductor loop 30, the structure thusly formed is referred to herein as a coaxial winding transformer (CWT) and may be analyzed using various theories from the current-transformer field.

The secondary loop 30 is coupled to a secondary converter 32. The converter 32 converts the high frequency AC power received from the primary converter 20 via link 25 and loop 30 into charging power, which is used to charge the vehicle battery 12. This charging power may be either AC or DC power or a combination thereof, such as AC power superimposed over a DC waveform. The particular type of charging power used in a given application is dictated by the energy requirements of the particular energy storage device being recharged.

The recharging system 10 may be operated by a method similar to a conventional gas pump at a roadside service station. The vehicle driver parks vehicle 14 adjacent to the primary converter 20 and couples the tethered link 25 with the power pickup loop 30 mounted to vehicle 14. After manually clamping link 25 to the vehicle power pickup 30, the primary converter includes control logic which verifies that the circuit is correct before beginning delivery of the high frequency AC power. The high frequency AC power received by pickup 30 from link 25 is converted into charging power by the secondary converter 32 and used to charge the battery 12.

Figure 2:
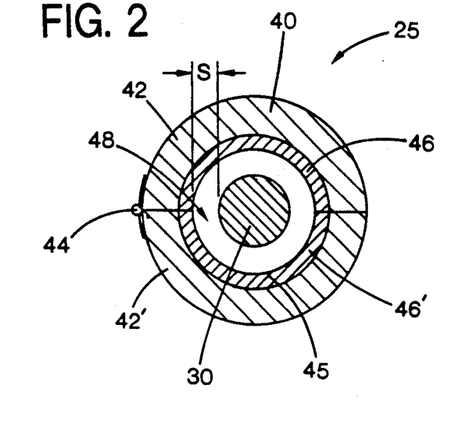
FIG. 2 is a radial sectional view of one form of a separable coupling link of FIG. 1.

Referring to FIG. 2, an illustrated embodiment of the coupling link 25 is shown coupled with the conductor loop 30 to form a CWT. The link 25 includes a separable magnetic core 40, illustrated as being split into two core portions or segments 42 and 42', which are pivoted together at hinge 44. The core segments 42 and 42' may be joined by a variety of other means (not shown) and openable by motion in other manners, such as by translational motion rather than pivotal motion, or some combination thereof. Furthermore, the coupling of link 25 with loop 30 may be accomplished by an opening type of motion by loop 30 (not shown) to receive link 25.

The link 25 also has a core-mounted conductor 45, illustrated as being split into two conductor portions or segments 46 and 46'. In the illustrated embodiment, conductor 45 is a solid tubular member, such as of copper. However, it is apparent that a plurality of discrete conductors may be used to form conductor 45, for instance, with the discrete conductors evenly distributed about the inner surface of the core to provide a substantially uniform distribution of current. Each of the conductor segments 46 and 46' are carried by core segments 42 and 42', respectively. With link 25 closed, as shown in FIG. 2, there are two minimal air gaps where core segments 42 and 42' abut. Also with link 25 closed, conductor 45 defines an interwinding region 48 within link 25. With the conductor loop 30 located in the interwinding region 48, an interwinding space S may be defined as between the conductor loop 30 and the core-mounted conductor 45.

When the link 25 is energized, instantaneous current (not shown) flows in opposite directions through the conductor loop 30 and the core-mounted conductor 45. That is, when the current is flowing in conductor loop 30 in a direction into the paper, current is flowing in conductor 45 in a direction oriented out of the paper.

While omitted for clarity in the FIG. 2, the conductor loop 30 is an insulated conductor having an inner portion of a conductive material surrounded by an outer layer of an insulative material. Similarly, the conductor 45 is also of a conductive material surrounded by insulation (not shown). The conductor 45 includes insulation adjacent the interwinding region 48 and between the conductive portion of conductor 45 and the core 40. The core 40 also has insulation (not shown) around its outer periphery. Additionally, the core 40 may have an outer covering (not shown) of a resilient, and durable material to protect the link 25 from damage during use.

Figure 3:
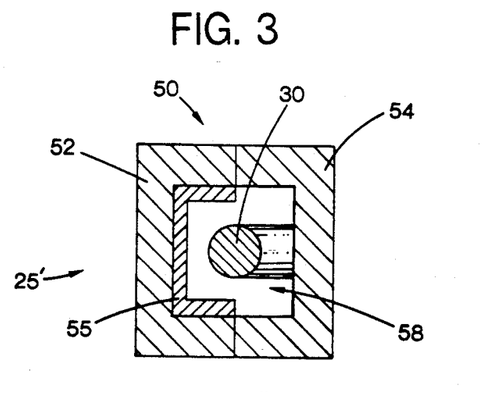
FIG. 3 radial sectional view of one form of an alternate separable coupling link of the present invention.

Referring to FIG. 3, an alternative embodiment of the link in FIG. 1 is shown as link 25'. The link 25' includes a separable or split core 50, illustrated as having two core segments 52 and 54. The core segment 52 carries a core-mounted conductor 55, illustrated as a C-channel member, for instance of solid copper. It is apparent that conductor 55 may also be comprised of a plurality of discrete members as described above for conductor 45 of FIG. 2. Referring to FIG. 1, the core-mounted conductor 55 may be coupled to the primary converter 20 by a conductor (not shown) within tether 22.

The core segment 54 is preferably mounted to the vehicle 14 on a permanent basis. Core segments 52 and 54 are each configured to abut one another to form a flux path of magnetic material having two minimal air gaps where core segments 42 and 42' abut. When the two core segments 52 and 54 are brought together into abutment, this flux path surrounds the conductor loop 30.

The illustrated conductor 30 passes freely in front of the core segment 54, extending through the interwinding region to mounting points (not shown) on the vehicle 14, and then electrically coupling to the converter 32. Alternatively, the conductor loop 30 may be supported from core segment 54 by a support (not shown) of an insulative material. When the core segments 52 and 54 are drawn together as shown in FIG. 3, they define therebetween an interwinding region 58 substantially surrounding an axial portion of the conductor loop 30.

In operation, a mechanical latching mechanism or device (not shown) may be used to secure the two core segments 52 and 54 together. However, when energized, the two core segments 52 and 54 are advantageously drawn together by the attendant magnetic forces, as are the core segments 42 and 42' of FIG. 2, when the net currents flowing through the conductors 30 and 55 are opposing. In other words, when the flux in each core segment is flowing in the same direction, these magnetic forces will draw the core segments together. Conversely, when the fluxes in each core segment are opposed, the core segments will be repelled from one another. These attractive forces advantageously assist in initiating and maintaining the coupling joint of the core segments, and thus, of the conductor segments. Furthermore, by using opposing flux flows, the forces may be used to repel the core segments and provide for controlled decoupling of the charging link.

Figure 4:
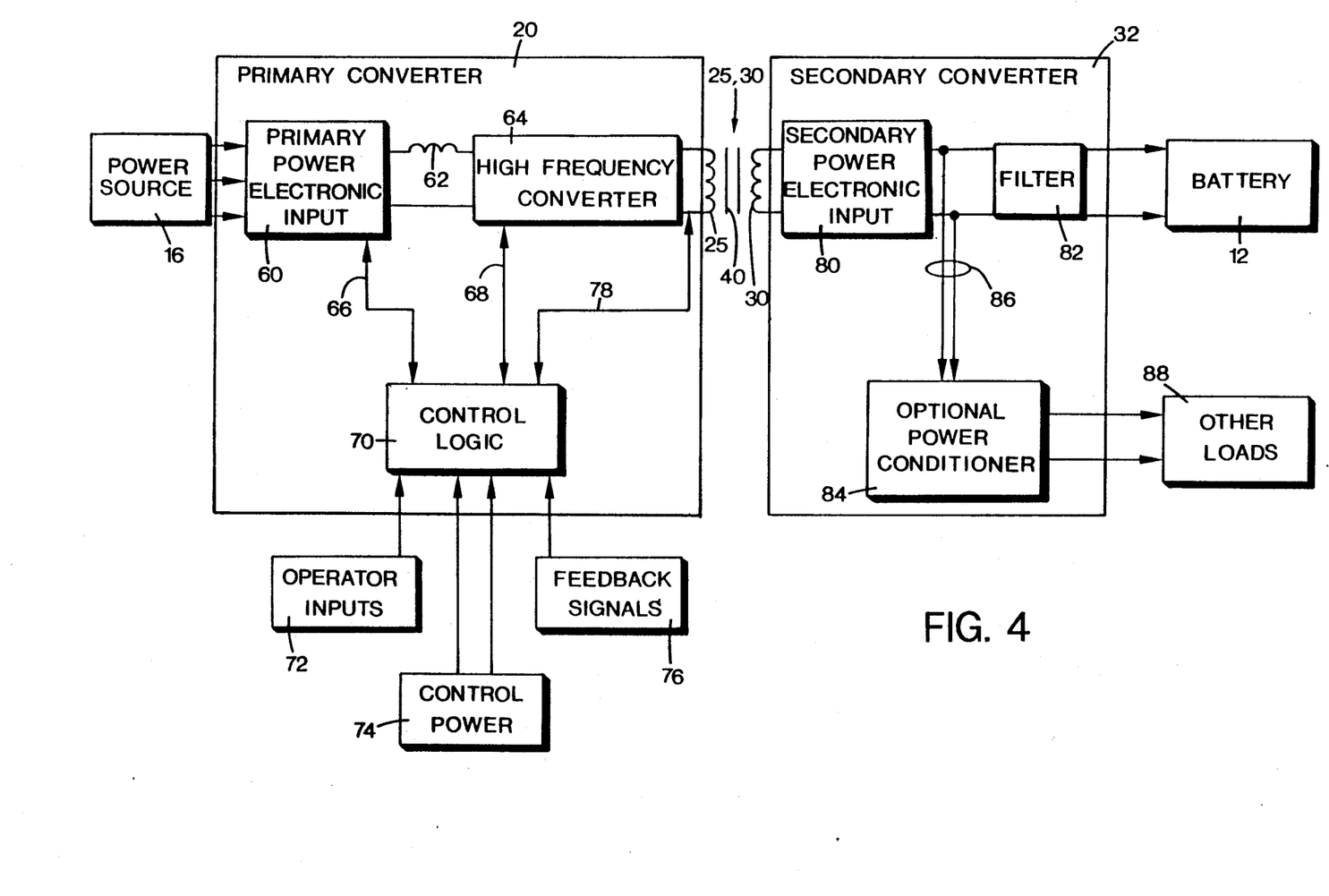
FIG. 4 is a schematic block diagram of one form of the contactless recharging system of FIG. 1.

FIG. 4 illustrates a method of operation of primary converter 20 and secondary converter 22, with the link 25 and conductor loop 30 shown schematically. The approach described herein uses power electronics to optimize system performance and to meet currently realized practical design considerations. In the illustrated embodiment, the power source 16 supplies power to primary converter 20. If the power supplied by source 16 is AC power, illustrated as three-phase AC power in FIG. 4, the converter 20 includes a primary power electronic input stage 60. The primary input stage 60 may be a conventional thyristor rectifier bridge using thyristors, transistors, gate turnoff thyristors (GTO's), and the like to convert the received AC power into DC power.

At power levels of commercial interest, such as greater than one megawatt (1 MW), for large vehicles or short recharge times, or at levels of 1-10 kW for passenger vehicles, one cost effective approach involves using a power electronics converter with a thyristor rectifier as the primary input stage. For the lower charging levels, a voltage source converter with transistor devices may be a preferred embodiment. The rectifier provides DC power to a choke coil 62 which together serve as a DC current source for a high frequency converter 64. The high frequency converter 64 may be any type of invertor capable of providing a high frequency output, such as a current source invertor. The converter 64 has a plurality of switching devices arranged and controlled as known in the art to provide a desired high frequency output to link 25. If the power source 16 supplies DC power to primary converter 20, the primary input stage 60 may advantageously be omitted.

The primary input stage 60 and the high frequency converter 64 each may receive respective control signals 66 and 68 from a control logic unit 70, which may be a microprocessor based device. The control logic unit 70 receives various operator inputs 72, such as a "begin conducting" or "on" switch signal.

Control power 74 is provided to the control logic unit 70, such as DC power required for a digital control system. The control logic unit 70 may also receive feedback signals 76, including: signals from current transducers (not shown) monitoring charging at the battery load 12 and the output of the high frequency convertor 64 as applied to link 25; a signal from a microswitch sensor (not shown) indicating that the link 25 is coupled to the conductor coil 30, indicating a "ready to charge" signal; and the like.

The control logic unit 70 may generate a communication or control signal 78. The control signal 78 may be sent to the secondary converter 32, or converter 32 may provide a feedback signal to control logic 70 via the communication signal 78. The communication or control signal 78 is typically sent at a much higher frequency than the power provided by high frequency converter 64. For example, the control signal 78 may be on the order of a megahertz frequency signal. Such transmission of control signals is routinely accomplished by utilities transmitting control signals over power transmission lines.

The secondary converter 32 has a secondary power electronic input stage 80 which receives power from conductor loop 30. The secondary input stage 80 converts the high frequency power transferred through link 25 into AC and/or DC power, or a combination of AC an DC power, as dictated by the needs of the battery 12. The required output power provided by the primary input stage 80 is filtered by filter 82 then supplied as charging power to the battery 12. Of course, if the energy storage device requires AC charging power, or a combination of AC and DC charging power, the power electronics of the secondary input stage 80 may be modified as known in the art to provide the required charging power.

The secondary converter 32 may include an optional power conditioner 84 which receives power from the output side of the secondary input stage 80 via conductors 86. However, it may be advantageous in some applications to tap the high frequency power received by conductor 30 before rectification at the input side of the secondary input stage 80. The power conditioner 84 provides power as required by other loads 88 which are typically mounted on-board the vehicle 14. To serve the needs of the other loads 88, the power conditioner 84 may be a bridge rectifier for a DC output, an AC/DC controlled convertor for variable DC output, or an AC/AC cycloconverter for variable AC output. The other loads 88 powered by conditioner 84 may be AC or DC loads, or some combination thereof.

For example, if the vehicle 14 is a motor home, the occupants may wish to watch television, cook on an electric stove, and/or use other electrical appliances in the motor home while the motor home battery 12 is being charged. Other loads 88 may also include: auxiliary relays for the battery recharging system 10; an electronic latching mechanism insuring that link 25 remains closed around conductor 30 during charging; a battery monitoring system to monitor the charging level of battery 12, such as a state-of-charge indicator; and a ventilation fan for a battery 12 enclosed within a small confined space.

In recharging system 10, control of the power delivered to the battery 12 may be achieved from the primary convertor 20 without feedback if there are no other loads 88. For example, the secondary convertor 32 and battery 12 may be monitored and controlled by the communication signal 78. Signal 78 is injected into the core-mounted conductor 45 and induced into the secondary conductor loop 30 of link 25, which serves as a carrier. This alternate embodiment of recharging system 10 has the least cost for the mobile equipment of the embodiments discussed herein. Additionally, the primary convertor 20 may deliver power in an open loop mode, that is without feedback, by controlling current flowing in the primary core-mounted conductor 45. Monitoring, control and protection signals may be achieved without the need for a separate control wire coupling between the primary convertor and vehicle 14.

The recharging system 10 may also handle multiple loads, which appear to the primary convertor 20 as series impedances. The convertor 20 regulates the current, and voltages change to accommodate any changes in the battery load 12 and other loads 88. Such a system may have some on-board control of the current delivered to battery 12 using the secondary converter 32. Even for a singular energy storage device, on-board control, in addition to the main control logic unit 70, is preferred. This is a preferred implementation because it provides greater flexibility and the ability to accommodate diverse battery types, manufacture variations, and equipment specification variations.

The advantages of the recharging system 10 include having a very simple structure incorporated into vehicle 14, that is, a power pickup loop 30 and the converter 32. Thus, system 10 can be implemented with minimal cost and complexity, either as a retrofit or in new vehicles. Further, this structure may be standardized for various vehicle models, and may be adapted with a minimum investment by the vehicle manufacturer and owner. Additionally, the control and protection features are provided by the stationary equipment, that is, by the primary converter 20. The owner of the stationary converter 20 provides maintenance and updates for the control equipment. Furthermore, this system may be readily accepted by the public, due to its close analogy to the conventional gas pump station.

One possible drawback to system 10 over the other embodiments discussed further below is that each stationary power supply location may require revised control logic and updates as technology evolves. With the system 10, the supplier of the energy has a maximum investment in the converter and control logic. Additionally, system 10 is less flexible regarding the vehicle owner's choice of recharge locations, unless the industry and commercial infrastructure completely standardize on this system. Furthermore, the operator of the electric vehicle 14 is more dependent upon the owner and operator of the converter station to provide a proper recharge strategy than in the system of FIG. 5 described below. Thus, a conflict may evolve if vehicle equipment is damaged or if battery life was found to be shorter than expected.

Figure 5:
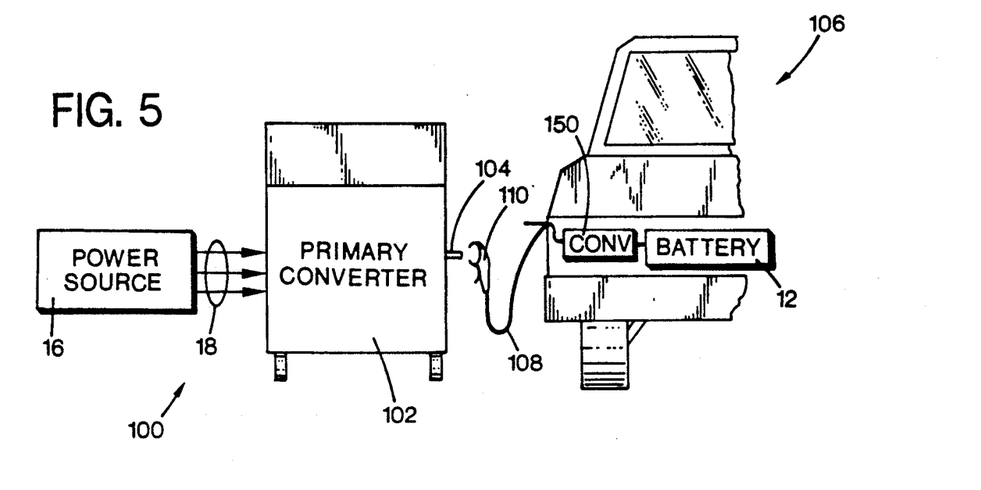
FIG. 5 is a partially schematic rear elevational view of an alternate form of a contactless recharging system of the present invention.

Referring to FIG. 5, an alternative embodiment of a contactless recharging system 100 of the present invention is shown. In the alternate charging system 100, an alternate primary convertor 102 receives power from the power source 16 via conductors 18. While the conductors 18 are illustrated for a three-phase AC power source, it is apparent that DC or other polyphase AC power may also serve as a suitable power source 16. The primary convertor 102 receives and converts power from source 16 into high frequency AC power as described further below, and provides a high frequency output power to a conductor loop 104. The operation of the various components of the recharging system 100, such as primary converter 102, is discussed further below after an overview of the operational interrelationship between the various components.

Vehicle 106 has an energy storage device as described above for vehicle 14, and referred to for simplicity herein as battery 12. However, vehicle 106 differs from vehicle 104 in the manner of control and coupling with the primary converter. Rather than having only a conductor loop 30 mounted on the vehicle (see FIG. 1), vehicle 106 has a tethering conductor or tether 108 which couples coupling means, such as a coupling sheath or link 110 to the vehicle 106. The tether 108 may be as described above for tether 22 of FIG. 1, and the link 110 may be constructed as described above with respect to FIG. 1, with the following differences.

The link 110 has a separable core 112 with separable core portions or segments 114 and 114' which may be pivoted or otherwise joined together as described above with respect to core segments 42 and 42' of FIG. 2. Here, the core segments 114 and 114' are shown pivoted together by a hinge 116.

Figure 6:
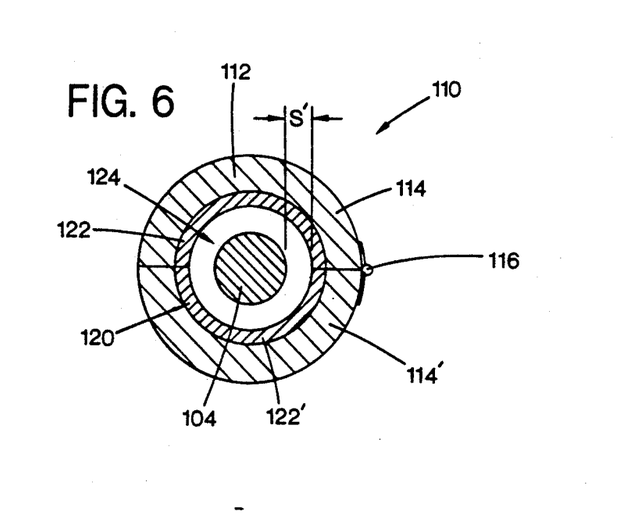
FIG. 6 is a radial sectional view of one form of a separable coupling link of FIG. 5.

The link 110 has a core-mounted conductor 120 split into two core portions or segments 122 and 122'. Each of the conductor segments 122 and 122' are carried by core segments 114 and 114', respectively. With link 110 closed, as shown in FIG. 6, there are two minimal air gaps where core segments 114 and 114' abut. Also with link 110 closed, conductor 120 defines an interwinding region 124 within link 110. With the conductor loop 104 located in the interwinding region 124, an interwinding space S' may be defined as between the conductor loop 104 and the core-mounted conductor 120.

Referring to FIG. 6, the method of operating link 110 differs from that of link 25 and 25', in that the coaxial winding transformer (CWT) formed by the coupling of link 110 with conductor loop 104 has power flows different from that of the links 25 and 25' shown in FIGS. 1-3. Specifically, the conductor loop 104 serves as the primary conductor in the power flow system. The core-mounted conductor 120 serves as a secondary conductor, receiving power through induction from the conductor loop 104. While link 110 is shown for the purposes of illustration as being similar in construction to link 25, it is apparent that link 110 may also take on a configuration as shown for FIG. 25'. Furthermore, other geometric forms are also possible for the coaxial winding transformer to transfer power between a core-mounted conductor and a loop conductor.

Figure 7:
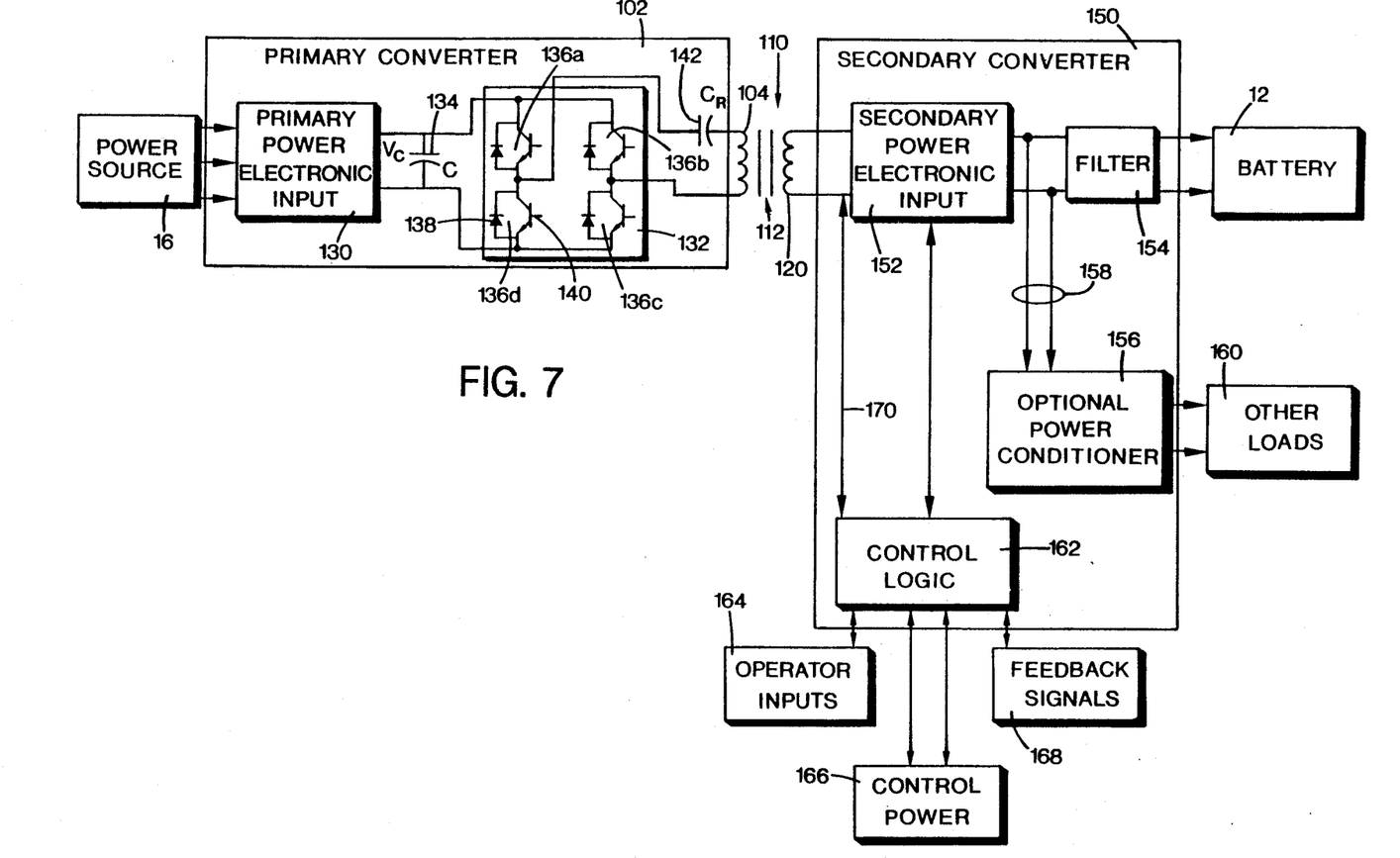
FIG. 7 is a schematic block diagram of one form of the contactless recharging system of FIG. 5.

An illustrated embodiment for the contactless recharging system 100 of FIG. 5 is shown schematically in FIG. 7. Power is received by primary converter 102 from power source 16 which may be as described above with respect to the system of FIG. 1. Power source 16 supplies a primary power electronic input stage 130, which may be as described above for the primary input stage 60 of FIG. 4. If DC power is supplied by source 16, primary input stage 130 may be omitted.

In the illustrated example, primary input stage 130 converts power from source 16 into DC power which is supplied to a high frequency converter, such as a series resonant high frequency converter 132. A capacitor 134 is used to provide a constant DC voltage to inverter 132. In the illustrated embodiment, the high frequency series resonant inverter 132 is shown as having four switched legs 136a, 136b, 136c and 136d. Each inverter leg, such as leg 136d, has a diode 138 coupled across the collector and emitter of a transistor 140. Other power electronic devices may also be used in place of switch 140, such as thyristors or gate turnoff thyristors (GTO's). The high frequency output of inverter 132 is supplied to a resonant capacitor 142.

Resonant converter topology is known in the art, for example, as described in an article by F. C. Schwarz and J. B. Klaassens entitled "Controllable 45 kW Current Source for DC Machines," IEEE Transactions IA, Vol. IA--15, No. 4, July/August, 1979, pp. 437-444. The use of resonant inverter topology advantageously allows the component ratings for the primary and secondary converters to be maintained at an economic level. The resonant capacitor 142 serves to supply the volt-amperes-reactive (VAR) requirements of the conductor loop 104, so the inverter 132 need only supply real power (watts) as needed by the system. The second concern governing the choice of converter topology is that inverter switching at high frequencies are normally limited by the switching losses within the devices. The use of resonant topologies allows device switching at near zero voltage or near zero current crossing points, which results in significantly lower switching losses and the ability to obtain higher frequencies.

Thus, the output of primary converter 102 is supplied to conductor loop 104 and by induction to the core-mounted conductor 120 of link 110 (each of which are shown schematically in FIG. 7). Referring also to FIG. 5, power received by link 110 is delivered via a conductor within tether 108 to a secondary converter 150 mounted on-board vehicle 106. The converter 150 has a secondary power electronic input stage 152 which receives power from the core-mounted conductor 120 and rectifies it into charging power supplied to filter 154. The secondary input stage 152 and filter 154 may be as described above for secondary input stage 80 and filter 82, respectfully, as discussed with respect to FIG. 4. The filtered rectified charging power is then supplied by secondary converter 150 to battery 12 for recharging.

The secondary converter 150 may be modified as known in the art to provide other types of charging power to the energy storage device. If desired, the secondary charging current can be conditioned with a frequency change, voltage change, or phase change. For example, the secondary power electronic input stage 152 may be a bridge rectifier for DC output, and AC/DC controlled converter for variable DC output, or an AC/AC cycloconverter for variable AC output. Such an implementation, with at least some control on both sides of link 110 is a preferred embodiment, as well as for a DC charging current embodiment.

The secondary converter 150 may also include an optional power conditioner 156, tapping a portion of the DC power rectified by the secondary input stage 152 via conductors 158. In some applications, it may be advantageous for power conditioner 156 to receive high frequency power directly from conductor 120, prior to processing by the secondary input stage 152. The power conditioner 156 provides power to other loads 160, which may be as described above for the other loads 88 of FIG. 4.

The secondary converter 150 includes a control logic unit 162, which may be of the same type as described for control logic unit 70 of FIG. 4. The control logic unit 162 receives operator inputs 164, control power 166, and a plurality of feedback signals 168, each of which may be as described above for operator input 72, the control power 74, and feedback signals 76, respectively, of FIG. 4.

The control logic unit 162 may communicate with the primary converter 102 via a communication or control signal 170. The communication control signal 170 may operate as described above for control signal 78, with ultra-high frequency communication and control signals, on the order of megahertz. The illustrated kilohertz power transmitted through link 110 serves as the carrier for the communication signal 170.

For example, the primary converter 102 and the power source 16 may be monitored and controlled with the communication signal 170. The communication signal 170 can be an analog modulation signal or a series of discrete digital pulses induced into the loop conductor 104. Monitoring, control and protection signals between the primary converter 102 and vehicle 106 are advantageously achieved without the need for a separate control wire coupling between the primary converter 102 and vehicle 106.

The recharging system 100 having the secondary converter 150, control logic unit 162, and link 110 all mounted on-board vehicle 106 has several advantages. For example, in a method of operation, the operator of vehicle 106 parks the vehicle adjacent the primary converter 102 and manually clamps link 110 around the stationary off-board conductor loop 104. The on-board secondary converter 150 provides power conditioning, recharge strategy logic, circuit protection and safety permissives.

The advantages of system 110 are that more of the control system is mounted on-board the vehicle, and thus the vehicle could have capabilities to adapt to non-standard primary converter power sources at various locations. Furthermore, less initial investment would be required by a power provider to construct a recharge location, that is the primary converter 102 has a more simple topology without the control strategy of the FIG. 1 charging system 10.

Additionally, recharge system 100 would be highly suitable for recharging vehicles during metered parking. The owner of vehicle 106 is in charge of maintenance, and protection of link 110 and tether 108, and they are thus likely to receive better care. Furthermore, the recharge system 100 requires only minimal standardization of infrastructure, and gives the operator of vehicle 106 a maximum choice of energy sources.

However, the recharge system 100 will provide a higher initial cost to the owner of vehicle 106, and provide a more complex on-board system requiring maintenance. Furthermore, the energy supplier in charge of the primary converter 102 is more dependent proper operation of the vehicle owner's equipment to prevent damage to the primary converter 102. The vehicle 106 must carry the additional weight and provide the additional space for the control logic, tether 108 and link 110. Additionally, the expensive control and converter equipment works under a lower load factor than the recharging system 10 of FIG. 1, that is, the expensive hardware of system 100 is used less per day than the converter equipment of FIG. 1.

Figure 8:
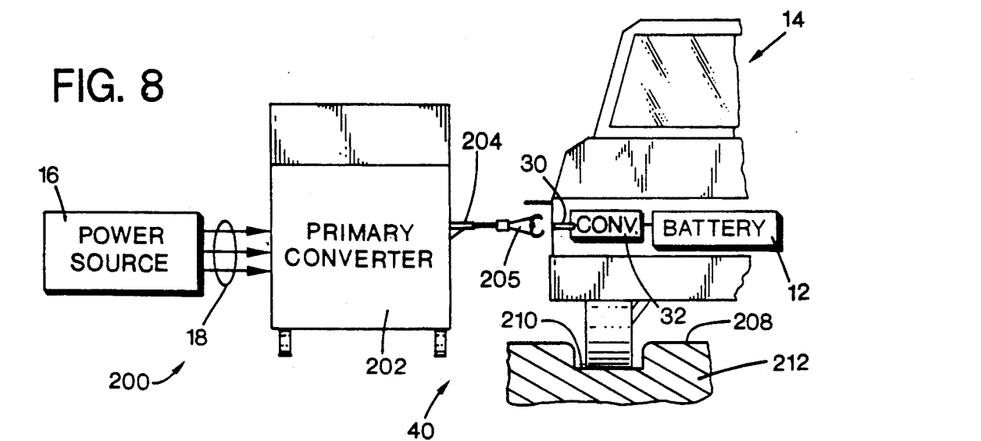
FIG. 8 is a partially schematic rear elevational view of form of a contactless recharging system of the present invention.

FIG. 8 illustrates an automatic contactless recharging system 200 which may operate as illustrated schematically in FIG. 4, and may have a link 25 or 25' as shown in FIGS. 2 or 3. The recharge system 200 has a primary converter 202 receiving power from the power source 16 via conductors 18, as described above for FIG. 1. The electric vehicle 14 of FIG. 8 may be identical to vehicle 14 in FIG. 1, having a power pickup conductor loop 30 coupled with a secondary converter 32. The secondary converter 32 provides the required charging power to the energy storage device as described above for the FIG. 1 embodiment, and is shown as a battery 12 only for simplicity herein.

The primary converter 202 may be as described above for converter 20, but preferably also includes several additional control features. Rather than the tether 22 and manually coupled link 25 of FIG. 1, the automatic recharging system 200 has a robotic-type positionable arm 204, which may be actuator operated. The arm 204 extends outwardly from primary converter 202 to support automatic coupling means, such as a coupling sheath or link 205. If the link 205 has a separable core, such as core 40 of FIG. 2, the robotic arm 204 may be a reach and grasp type arm which opens the link 205 to receive conductor loop 30 and then closes the link around the vehicle-mounted conductor 30. If link 205 is similar to link 25' shown in FIG. 3, the robotic arm maintains position of core segment 52 and conductor 55 with respect to core segment 54 to provide a minimal air gap between the core segments 52, 54.

The method of operation of the automatic link 205 is similar to that of the manual coupling link 25, in that it is also configured to grasp and surround the pickup loop conductor 30 mounted on vehicle 14. Flux and position sensors, such as Hall effect and optical position sensors, respectively, (not shown) may be mounted on the arm 204 or link 205, or on the housing for converter 202. The position sensors are used in controlling the extension of arm 204 and link 205 into a grasping engagement with the pickup loop 30. The converter 202 may include control logic to receive signals from the position sensors and use these position sensor signals in moving arm 204 and link 205 into a charging position, and after charging, to retract to a neutral, starting or "at rest" position. Additionally, flux and position sensors can be mounted to the link and/or to the vehicle 16 to allow feedback of the arm position relative to conductor loop 30 for automatic positioning of the arm. Such use of sensors and positioning of the arm 204 in response thereto are well known in the robotic arm art.

In a method of operating the automatic recharging system 200 of FIG. 8, an operator of vehicle 14 parking the vehicle within a bounded area 208 adjacent primary converter 202. The vehicle may be positioned by a variety of means, such as with light indicators, limit switches, or simple recesses 210 in the pavement 212 adjacent converter 202. Upon actuation, the automatic system 100 automatically makes a contactless clamp-on coupling of link 205 with the vehicle-mounted conductor loop 30. The automatic system 200 allows for scheduling of recharge time and strategy, and provides automatic recharge, monitors and records results, then disconnects and provides an indication of completion to a driver of vehicle 14.

The advantages of the automatic recharging system 200 include the use of an positioning controller, as is well known in the art of robotic arms, in which maximum safety may be programmed. The automatic system 200 is also well suited to fleet operations where the vehicle parking pattern and operator use are consistent. That is, fleet vehicles are typically in the care of a single driver, and are required to be parked in designated areas, rendering automatic recharge a very attractive option for fleet use.

Furthermore, the automatic system 200 provides a maximum ability, compared to the other systems discussed herein, to provide high usage rates, to minimize on-going labor, and the ability to provide load leveling or automatic scheduling of power delivery as a part of an energy management system to reduce peak power demand, that is, to recharge during the non-peak load hours of the utility. Furthermore, the system 200 is well suited to automatic diagnostics, trend monitoring, and automatic record keeping systems.

Finally, there is minimal user involvement required with the automatic system 200, other than parking the vehicle in the designated location adjacent the primary converter 202. However, the automatic system 200 is the most complex of the three proposed here. The automatic system 200 has a higher initial cost and may be sensitive to user abuse. Additionally, system 200 is highly dependent upon standardized vehicle dimensions and standardization of the converter circuit 32 on-board the vehicle. Additionally, system 200 is less likely to be implemented for recharging at various distributive sites.

As discussed above, each system has its features and drawbacks. System 10 of FIG. 1 aesthetically resembles a gasoline service station configuration. The recharging system 100 of FIG. 5 resembles a conventional consumer electric appliance having a cord plugging into a power receptacle. Thus, conceptually, recharging systems 10 and 100 would likely be well received by the consuming public, depending upon whether they consider an electric vehicle to be similar to a gasoline powered car, or an electric appliance. The automatic system 200 of FIG. 8 has appeal in that no user contact with the coupling is required to initiate charging, other than proper parking of the vehicle 14 adjacent the primary converter 42. However, the robotic arm is more complex and costly to implement than the systems of FIGS. 1 and 5.

Thus, the contactless battery recharging system described herein is suitable for high frequency operation, on the order of 2-50 kHz, with a very high power density of the CWT link conductors and converters operating with a very fast response time. Additionally, the power connection between the primary converter and vehicle requires no exposed conductors at any time. Additionally, the recharging circuit is insensitive of the position of the core relative to the inner conductor in all directions, that is axially and radially. This insensitivity to the position of the inner conductor with respect to the outer conductor allows for a large interwinding clearance while still maintaining output performance. These various features render the recharging system described herein to be in a practical sense both physically simple and rugged to compensate for user and environmental physical abuse to the various components of the system.

Recharging systems 10, 100 and 200 supply power to their respective links at a high frequency, such as on the order of 20 kHz for loads of 1-100 kW, and 2 kHz for loads greater than 1 megawatt (1 MW). The primary current provided by the stationary converter induces an equal and opposite amount of ampere-turns in the onboard secondary winding, without any physical contact between the conductors in the CWT. Furthermore, the interwinding space in the CWT may be filled with non-magnetic material for electrical and environmental insulation. Both the primary and secondary circuits of the CWT advantageously have no exposed conductors and no exposed magnetic core material when transferring power. Thus, maximum safety may be achieved in these systems with complete encapsulation of both sides of the CWT, that is, encapsulation of the conductor and core portions mounted to the primary converter and the vehicle-mounted conductor and core portions.

Having illustrated and described the principles of our invention with respect to several preferred embodiments, it should be apparent to those skilled in the art that our invention may be modified in arrangement and detail without departing from such principles. For example, other core configurations may be used for the links described herein, as well as other configurations for the core-mounted conductor, and the substitution of other devices and configurations known to be interchangeable by those skilled in the art. Also, the location of the core may be opposite to the control logic, for instance, the CWT configuration of FIGS. 1-3 may be used with the primary and secondary converters 102 and 150 of FIG. 7. Also, the operator inputs 72 and 174 may be received by either the primary or the secondary converters in FIGS. 4 and 7. Additionally, suitable material substitutions and dimensional variations may be made for the components of the link as described herein. Additionally, the configuration of the primary and secondary converters may vary substantially, depending upon the state of the art of power electronics and other switching devices. We claim all such modifications falling within the scope and spirit of the following claims.

We claim:

1. A contactless charging system for charging an energy storage device, comprising:
   a primary converter for converting power from a power source into high frequency power;
   a secondary converter coupled to the energy storage device for converting high frequency power into charging power to charge the energy storage device;
   a conductor loop coupled to one of the primary converter and the secondary converter; and a coupling link having a magnetic core and a core-mounted conductor at least partially surrounded by the magnetic core, the core-mounted conductor coupled to the other of the primary converter and the secondary converter, the core-mounted conductor for selectively at least partially surrounding a portion of the conductor loop to transfer power therebetween.

2. A contactless charging system according to claim 1 wherein:
   the conductor loop is coupled to the secondary converter; and
   the coupling link core-mounted conductor is coupled to the primary converter.

3. A contactless charging system according to claim 2 wherein the coupling link is coupled to the primary converter by a flexible tether.

4. A contactless charging system according to claim 2 wherein the coupling link is coupled to the primary converter by a positionable arm.

5. A contactless charging system according to claim 1 wherein:
   the conductor loop is coupled to the primary converter; and
   the coupling link core-mounted conductor is coupled to the secondary converter.

6. A contactless charging system according to claim 5 wherein the coupling link is coupled to the primary converter by a flexible tether.

7. A contactless recharging system according to claim 5 wherein the coupling link is coupled to the primary converter by a positionable arm.

8. A contactless recharging system according to wherein the primary converter comprises a current source converter.

9. A contactless recharging system according to wherein the primary converter comprises a voltage source converter.

10. A contactless recharging system ,according to wherein the secondary converter has a power conditioner tapping a portion of the transferred power and conditioning the tapped portion of the transferred power.

11. A contactless recharging system according to claim 10 wherein the energy storage device is mounted on an electric vehicle having an onboard vehicle load.

12. A contactless recharging system according to claim 11 wherein the conditioned tapped portion of the transferred power powers the onboard vehicle load.

13. A contactless recharging system according to claim 1 wherein the coupling link magnetic core is split into at least two segments pivoted together, with the core-mounted conductor being split into at least two segments corresponding to the split of the magnetic core, the link being openable to receive the conductor loop and closable to substantially surround the conductor loop.

14. A contactless recharging system according to claim 1 wherein the system further includes a conductor loop magnetic core segment permanently surrounding a portion of the conductor loop.

15. A contactless recharging system according to claim 14 wherein the coupling link magnetic core and the conductor loop magnetic core segment are configured for coupling together to provide a flux path about the conductor loop.

16. A contactless recharging system according to claim 14 wherein the conductor loop magnetic core segment supports a portion of the conductor loop.

17. A contactless charging system according to claim 1 wherein the primary converter comprises a resonant frequency converter.

18. A contactless charging system according to claim 1 wherein the primary converter includes control logic for controlling the charging in response to operator inputs and other feedback signals.

19. A contactless charging system according to claim 1 wherein the secondary converter includes control logic for controlling the charging in response to operator inputs and other feedback signals.

20. A contactless charging system according to claim 1 wherein the primary and secondary converters each include control logic for controlling in part the charging in response to operator inputs and other feedback signals.

21. A contactless battery charging system for charging a battery onboard an electric vehicle, comprising:
   a primary converter for converting power from a power source into high frequency power;
   a secondary converter on board the vehicle coupled to the battery for converting high frequency power into charging power to charge the battery;
   a conductor loop coupled to one of the primary converter and the secondary converter; and
   a coupling link having a magnetic core and a core-mounted conductor at least partially surrounded by the magnetic core, the core-mounted conductor coupled to the other of the primary converter and the secondary converter, the core-mounted conductor for selectively at least partially surrounding a portion of the conductor loop to transfer power therebetween.

22. A contactless battery charging system according to claim 21 wherein:
   the conductor loop is coupled to the secondary converter; and
   the core-mounted conductor is coupled to the primary converter.

23. A contactless battery charging system according to claim 22 wherein the coupling link is coupled to the primary converter by a flexible tether.

24. A contactless battery charging system according to claim 22 wherein the coupling link is coupled to the primary converter by a positionable arm.

25. A contactless battery charging system according to claim 21 wherein:
   the conductor loop is coupled to the primary converter; and
   the core-mounted conductor is coupled to the secondary converter.

26. A contactless battery charging system according to claim 25 wherein the coupling link is coupled to the primary converter by a flexible tether.

27. A contactless battery charging system according to claim 25 wherein the coupling link is coupled to the primary converter by a positionable arm.

28. A contactless battery charging system according to claim 21 wherein the primary converter comprises a current source converter.

29. A contactless battery charging system according to claim 21 wherein the primary converter comprises a voltage source converter.

30. A contactless battery charging system according to claim 21 wherein:
the electric vehicle has an onboard vehicle load; and
the secondary converter has an optical power conditioner tapping a portion of the transferred power and conditioning the tapped portion of the transferred power for powering the onboard vehicle load.

31. A contactless battery charging system according to claim 21 wherein the coupling link magnetic core is split into at least two segments openably joined together, with the core-mounted conductor being split into at least two segments corresponding to the split of the magnetic core, the link being openable to receive the conductor loop and closable to substantially surround the conductor loop.

32. A contactless battery charging system according to claim 31 wherein the at least two segments of the coupling link magnetic core are pivoted together.

33. A contactless battery charging system according to claim 21 wherein:
the system further includes a conductor loop magnetic core segment permanently surrounding a portion of the conductor loop; and
the coupling link magnetic core and the conductor loop magnetic core segment are configured for coupling together to provide a flux path about the conductor loop.

34. A contactless battery charging system according to claim 21 wherein the conductor loop magnetic core segment supports a portion of the conductor loop.

35. A method of charging an energy storage device, comprising the steps of:
converting power from a power source into high frequency power;
providing a conductor loop coupled to one of the primary converter and the secondary converter;
providing the other of the primary converter and the secondary converter with a coupling link having a magnetic core and a core-mounted conductor at least partially surrounded by the magnetic core; and
selectively joining the coupling link to the conductor loop to at least partially surround a portion of the conductor loop;
transferring the high frequency power between the primary and secondary converters;
converting the transferred high frequency power into charging power; and
charging the energy storage device with the converted charging power.

36. A method of charging according to claim 35 wherein the providing steps comprise providing the conductor loop coupled to the secondary converter and providing the primary converter with the coupling link.

37. A method of charging according to claim 36 wherein the providing steps comprise providing the primary converter with the coupling link coupled thereto by a flexible tether.

38. A method of charging according to claim 37 wherein the providing steps comprise providing the primary converter with the coupling link coupled thereto by a positionable arm.

39. A method of charging according to claim 38 wherein the method further includes the step of automatically coupling the coupling link to the conductor loop using the positionable arm.

40. A method of charging according to claim 35 wherein the providing steps comprise providing the conductor loop coupled to the primary converter and providing the secondary converter with the coupling link.

41. A method of charging according to claim 40 wherein the providing steps comprise providing the secondary converter with the coupling link coupled thereto by a positionable arm.

42. A method of charging according to claim 41 wherein the method further includes the steps of automatically coupling the coupling link to the conductor loop using the positionable arm.

43. A method of charging according to claim 41 wherein:
the energy storage device is mounted on an electric vehicle having an onboard vehicle load; and
the converting step comprises converting the transferred high frequency power into charging power onboard the vehicle.

44. A method of charging an energy storage device with power from an AC power source, comprising the steps of:
providing a conductor loop coupled to one of the energy storage device and the AC power source;
providing the other of the energy storage device and the AC power source with a coupling link having a magnetic core and a core-mounted conductor at least partially surrounded by the magnetic core, the link being separable into at least two link segments;
separating the at least two link segments;
receiving a portion of the conductor loop between the two separated link segments;
joining together the at least two link segments to surround the portion of the conductor loop with the coupling link;
transferring power from the AC power source by magnetic induction between the conductor loop and the coupling link to charge the energy storage device.

45. A method according to claim 44 wherein:
at least two of the link segments are separable and joinable by a relatively translational motion therebetween;
the separating step comprises sliding the at least two link segments apart from one another; and
the joining step comprises sliding the at least two link segments together.

46. A method according to claim 44 wherein;
at least two of the link segments are pivoted together to be pivotally separable and joinable;
the separating step comprises pivotally separating the at least two link segments apart from one another; and
the joining step comprises pivotally joining the at least two link segments together.

47. A method according to claim 44 wherein:
at least two of the link segments are radially separable and joinable by a relatively translational motion therebetween in radial directions respectively away from and toward a longitudinal axis of the received portion of the conductor loop;
the separating step comprises moving the at least two link segments substantially radially apart from one another; and
the joining step comprises moving the at least two link segments together substantially radially toward the received portion of the conductor loop.

48. A method according to claim 44 further including, between the separating and receiving steps, the step of inserting the portion of the conductor loop between the separated at least two link segments.

49. A contactless recharging system according to claim 1 wherein the coupling link is separable into at least two link segments which are translationally openable for disengaging the conductor loop and translationally closable for engaging the conductor loop for power transfer therebetween.

50. A contactless recharging system according to claim 1 wherein the coupling link is separable into at least two link segments which are radially openable for disengaging the conductor loop and radially closable for engaging the conductor loop in radial directions respectively away from and toward a longitudinal axis of the surrounded portion of the conductor loop.

* * * * *

UNITED STATES PATENT AND TRADEMARK OFFICE
CERTIFICATE OF CORRECTION

Page 1 of 3

PATENT NO. : 5,157,319
DATED : October 20, 1992
INVENTOR(S) : Klontz et al.

It is certified that error appears in the above-identified patent and that said Letters Patent is hereby corrected as shown below:

Column 2, line 26, "FIG. 3 radial" should be --FIG. 3 is a radial--;

Column 2, line 38, "of form" should be --of another alternate form--;

Column 7, line 67, "122' Each" should be --122'. Each--;

Column 12, line 8, "!4" should be --14--;

Column 13, claim 1, line 14, after "converter; and" a new paragraph should begin with the words --a coupling--.

Column 13, claim 7, line 44, "recharging" should be --charging--;

Column 13, claim 8, line 47, "recharging" should be --charging--;

Column 13, claim 8, lines 47-48, "to wherein" should be --to claim 1 wherein--;

UNITED STATES PATENT AND TRADEMARK OFFICE
CERTIFICATE OF CORRECTION

Page 2 of 3

PATENT NO. : 5,157,319
DATED : October 20, 1992
INVENTOR(S) : Klontz et al.

It is certified that error appears in the above-identified patent and that said Letters Patent is hereby corrected as shown below:

Column 13, claim 9, line 50, "recharging" should be --charging--;

Column 13, claim 9, lines 50-51, "to wherein" should be --to claim 1 wherein--;

Column 13, claim 10, line 53, "recharging" should be --charging--;

Column 13, claim 10, lines 53-54, "system ,according to wherein" should be --system according to claim 1 wherein--;

Column 13, claim 11, line 58, "recharging" should be --charging--;

Column 13, claim 12, line 61, "recharging" should be --charging--;

Column 13, claim 13, line 64, "recharging" should be --charging--;

UNITED STATES PATENT AND TRADEMARK OFFICE
CERTIFICATE OF CORRECTION

PATENT NO.   :   5,157,319
DATED        :   October 20, 1992
INVENTOR(S)  :   Klontz et al.

It is certified that error appears in the above-identified patent and that said Letters Patent is hereby corrected as shown below:

Column 14, claim 14, line 4, "recharging" should be --charging--;

Column 14, claim 15, line 8, "recharging" should be --charging--;

Column 14, claim 16, line 13, "recharging" should be --charging--; and

Column 16, claim 46, line 61, "wherein;" should be --wherein:--.

Signed and Sealed this

Thirtieth Day of November, 1993

Attest:

BRUCE LEHMAN

Attesting Officer

Commissioner of Patents and Trademarks